United States Patent [19]

McCarty

[11] Patent Number: 4,946,125
[45] Date of Patent: Aug. 7, 1990

[54] EYEGLASS HOLDER

[76] Inventor: Allan McCarty, 1112 Pinehurst, Royal Oak, Mich. 48073

[21] Appl. No.: 372,705

[22] Filed: Jun. 26, 1989

[51] Int. Cl.⁵ .............................................. A47F 5/00
[52] U.S. Cl. .................................... 248/316.7; 248/902
[58] Field of Search ............... 248/309.1, 316.7, 902, 248/218.1, 225.1, 223.4, 224.1, 224.3; 211/13; 24/555, 556, 546; 224/312, 311, 47.42; D16/129

[56] References Cited

U.S. PATENT DOCUMENTS

| D. 152,254 | 1/1949 | Gallo | 248/902 X |
|---|---|---|---|
| 993,404 | 5/1911 | Price . | |
| 2,104,612 | 1/1938 | Droll | 248/218.1 X |
| 2,467,251 | 4/1949 | Bowman . | |
| 2,557,518 | 6/1951 | Simpson | 24/555 X |
| 2,997,270 | 8/1961 | Farndon | 248/902 X |
| 3,003,734 | 10/1961 | Davis et al. | 248/223.4 |
| 3,195,731 | 12/1963 | Bomar, Jr. . | |
| 3,259,348 | 7/1966 | Dann . | |
| 3,519,138 | 7/1970 | Murray . | |
| 3,596,861 | 8/1971 | Baldini | 248/223.4 |
| 3,622,116 | 2/1970 | Fellows | 248/224.1 X |
| 4,128,224 | 12/1978 | Guichard | 248/902 X |
| 4,239,167 | 12/1980 | Lane . | |
| 4,576,320 | 3/1986 | Mead | 224/42.42 |
| 4,702,451 | 10/1987 | Salazar | 206/5 X |
| 4,723,748 | 2/1988 | McCarty | 248/223.4 X |

Primary Examiner—J. Franklin Foss
Attorney, Agent, or Firm—Basile and Hanlon

[57] ABSTRACT

A holder for supporting an article, such as a pair of eyeglasses, on a support surface. The holder includes a housing having spaced top and bottom walls interconnected by a back wall and an open end opposed from the back wall. Resilient article support members are mounted on the top and bottom walls of the housing with opposed facing surfaces disposed in substantial registry to define a resiliently openable cavity between such opposed surfaces of the resilient article support members for slidably and releasably supporting an article therebetween. The holder is removably mountable on a support surface via a planar fastener having spaced first and second legs slidably penetrable with the support surface and a central clip portion disposed between and connected to the first and second legs which slidably receives a complimentary shaped exterior peripheral recess formed in the top wall of the housing.

12 Claims, 1 Drawing Sheet

EYEGLASS HOLDER

BACKGROUND OF THE INVENTION

1. Field of the Invention:

The present invention, in general, relates to article holders and, specifically, to eyeglass holders and, more specifically, to eyeglass holders which are mountable on a support surface.

2. Description of the Prior Art:

Holders have long been used to mount a variety of articles in a convenient location on a support surface, such as a tabletop, wall, etc. A number of holders have been devised specifically for mounting eyeglasses, when not stored in the eyeglass storage case, in a readily accessible location, such as on a table or desktop or in a vehicle, such as on the dashboard or visor of an automobile.

Due to vibrations generated by movement of such vehicles, eyeglass holders designed for use in such environments must be designed to securely hold the eyeglasses in place to prevent their movement and possible damage. At the same time, such holders must permit easy insertion and removal of the eyeglasses to and from the holder.

Unless such eyeglass holders are integrally designed into the vehicle structure, such as in conjunction with a map or dome light housing mounted within the vehicle, suitable mounting means must be provided to attach the holder to a support surface within the vehicle. Such mounting means have included suction cups, clips and the penetrable fastener arrangement disclosed in U.S. Pat. No. 4,732,748, for an ARTICLE HOLDER, filed in the name of Allan McCarty, the inventor of the eyeglass holder of the present invention.

Another design criteria for holders mountable within the interior of the vehicles is that such holders must retain the articles in as small a space as possible due to the minimal amount of interior space available in today's vehicles. Also, such holders must retain the articles in a shape or location which does not interfere with the vision of the occupants of the vehicle.

Previously designed eyeglass holders specifically configured for use in vehicles have lacked one or more of these design features, such as easy mounting to a vehicle support surface, secure retention of the eyeglasses during movement of the vehicle and/or allowing easy insertion or removal of the eyeglass holders to and from the holder.

Thus, it would be desirable to provide an article holder specifically configured for holding eyeglasses which overcomes the problems encountered with previously devised article holders, especially vehicle mounted eyeglass holders. It would also be desirable to provide an eyeglass holder which securely retains a pair of eyeglasses in a fixed position during operation of the vehicle. It would also be desirable to provide an eyeglass holder which enables easy insertion and removal of the eyeglasses to and from the holder. It would also be desirable to provide an eyeglass holder which is easily mounted on a support surface within the interior of a vehicle. Finally, it would be desirable to provide an eyeglass holder which is easily and removably mountable on a support surface within a vehicle.

SUMMARY OF THE INVENTION

The present invention is a holder for mounting and supporting an article, such as eyeglasses, on a support surface. Particularly, the present invention is an eyeglass holder mountable on a support surface within a vehicle, such as an automobile.

The holder of the present invention includes a housing in which is mounted a resilient article support means. The resilient article support means includes first and second opposed surfaces disposed in substantial registry at ceratin portions along their length which define a resiliently openable cavity therebetween for slidably and releasably receiving an article, such as eyeglasses. With regard to the specific use of eyeglasses, the resilient configuration of the resilient article support means in the housing securely maintains the eyeglasses in a fixed position when the crossed temple portions of the eyeglasses are inserted between the opposed surfaces of the resilient article support means such that the ear portions on the temple pieces of the eyeglasses are disposed adjacent the side edges of the resilient article support means to prevent sideways movement of the eyeglasses within the holder.

In a preferred embodiment, the holder is a standalone body having a top wall, a bottom wall spaced from the top wall, a back wall innerconnecting the spaced top and bottom walls and an open end opposed from the back wall. The resilient article support means includes a first resilient article support member mounted on the top wall of the body. A second resilient article support member comprised of first and second spaced article support members is mounted on the bottom wall of the housing which also is formed of first and second spaced bottom wall members. This configuration provides an opening between the spaced first and second bottom wall members and the second portions of the resilient article support means to enable eyeglasses stored within the holder to be easily grasped for removal and/or insertion.

Also, the resilient article support means, in a preferred embodiment, is formed of an open cell foam with an outer cover layer attached thereto which provides a smooth slidable surface between the opposed surfaces of the resilient article support means. The outer cover layer may be a separate material layer attached to the open cell portion of the resilient article support means or may be integrally formed therewith in a closed cell, self-skinning foam configuration to provide the desired smooth surface characteristics.

The article holder of the present invention also includes mounting means for removably mounting the article holder in a desired accessible location on a support surface within the interior of a vehicle. In a preferred embodiment, the mounting means includes a planar fastener having first and second legs slidably penetrable into the support surface within the vehicle. A central portion is integrally formed between the first and second legs and has a configuration complimentary to the shape of an exterior peripheral recess formed on the top wall of the housing. The recess is formed of an inner portion contiguous with the top wall of the housing which is disposed in an open recess formed in the top wall of the housing. An outer cover member having dimensions larger than that of the inner member overlays the inner member and forms an exterior peripheral recess about the periphery of the inner member and the overhanging edges of the outer cover member which is slidably engageable with the central portion of the fastener to attach the housing to the fastener.

The unique article holder of the present invention is particularly suited for use in supporting eyeglasses in a readily accessible location on a support surface, such as a support surface within the interior of a vehicle. The holder provides a secure support for the eyeglasses at any desired location within the vehicle, such as on the roof headliner, etc., and prevents any movement of the eyeglasses during operation of the vehicle as has occurred with previously devised vehicle mounted article holders. The article holder of the present invention is easily mountable on a support surface within the vehicle via the unique interconnectable fastener and fastener attachment means formed on the holder.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
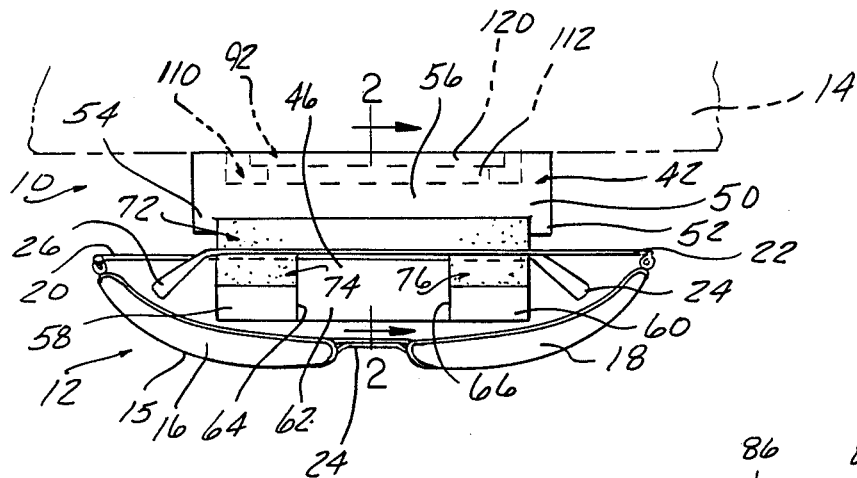
FIG. 1 is a front elevational view of the article holder of the present invention showing its use in supporting a pair of eyeglasses in a horizontal orientation on a horizontally extending support surface.

Throughout the following description and drawing, an identical reference number is used to refer to the same component shown in multiple figures of the drawing.

Figure 2:
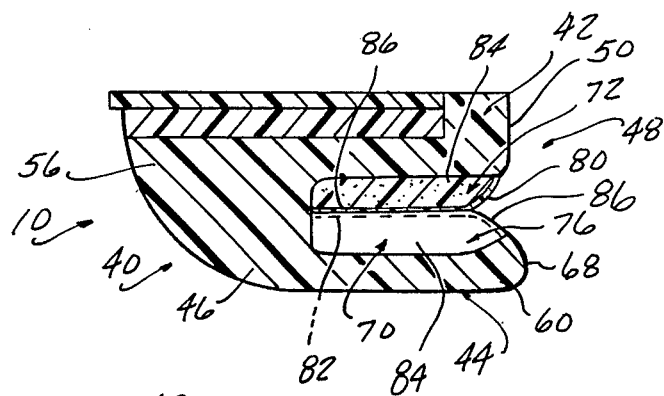
FIG. 2 is a cross-sectional view generally taken along line 2—2 FIG. 1.
Figure 3:
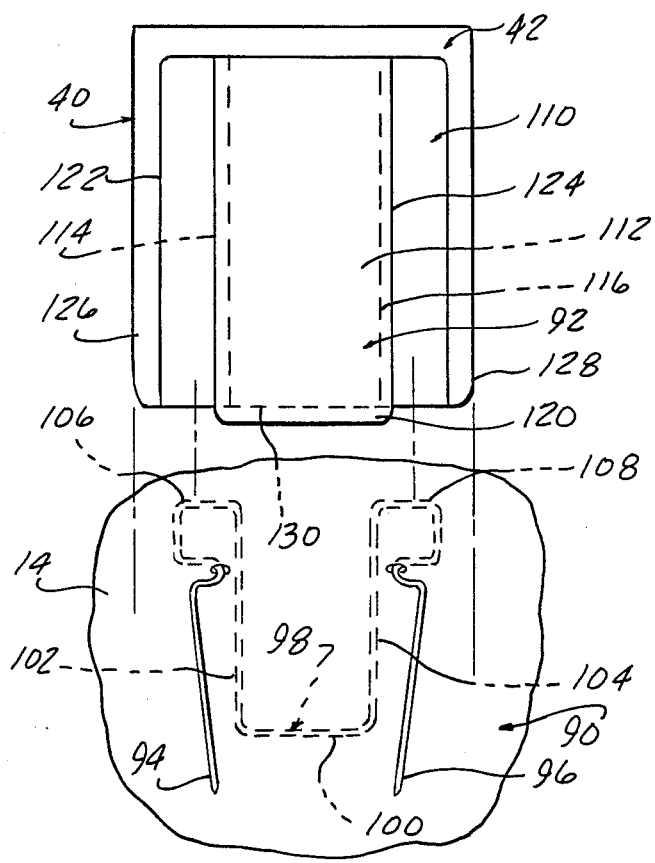
FIG. 3 is an exploded plan view of the mounting means of the article holder of the present invention taken from the back side of the support surface shown in FIG. 1.

Referring to the drawing, and to FIGS. 1, 2 and 3 in particular, there is illustrated an article holder denoted in general by reference number 10 which is particularly suited for supporting a pair of eyeglasses 12 in a readily accessible location on a support surface, such as on the roof headliner 14 within the interior of a vehicle, such as an automobile.

The article holder 10 shown in FIG. 1 is adapted for supporting a variety of articles, depending upon its configuration, on a support surface, either horizontal, vertical, or angular orientations therebetween; although a horizontal orientation is depicted in FIG. 1 by way of example only. Further, depending upon the configuration of the article holder 10, articles having different shapes may be securely and removably mounted therein.

By way of example only, the article holder 10 is illustrated in FIG. 1 as removably supporting a pair of eyeglasses 12. As is conventional, a pair of eyeglasses 12 includes a wire or plastic frame 15 which surrounds a right and left lens 16 and 18, respectively. Right and left temple pieces 20 and 22 are pivotally connected at one end to a portion of the frame 15 and are designed to extend along the sides of the wearer's head so that the lenses 16 and 18 are positioned in front of the eyes of the wearer by means of a bridge 24 which rests on the nose of the wearer and ear pieces 24 and 26 attached at the opposite end of the temple pieces 20 and 22, respectively, which rest on the ears of the wearer. In storing the eyeglasses 12 when not in use, it is conventional to fold or cross the temple pieces 20 and 22 over each other as shown in FIG. 1 so as to reduce the overall size of the eyeglasses 12 for convenient insertion into an eyeglass case, purse or pocket of the user.

In a preferred embodiment, the holder 10 includes a housing 40. However, this is by way of example only as the housing 40 is depicted as a stand-alone, separate article. It will be understood that the housing 40 may be integrally formed as a part of another housing or article, such as a map or dome light housing, which is mounted within the interior of a vehicle.

The housing 40 is formed of any suitable material, but preferably of a lightweight plastic for inexpensive manufacture via conventional molding techniques. The housing 40 includes a top wall 42, a bottom wall 44 spaced from the top wall 42, a back wall 46 which interconnects the top and bottom walls 42 and 44 and an open end 48 opposite from the back wall 46.

The terms top wall, bottom wall, back wall and open end are used to refer to the housing 40 when disposed in the horizontal orientation illustrated in FIGS. 1, 2 and 3. It will be understood that other terms may be employed to describe these portions of the article holder 10 of the present invention when the article holder 10 is employed in other orientations, such as vertical, etc.

The back wall 46, as viewed in FIGS. 1 and 2, is a generally, planar member extending along the entire length of the housing 40. The top wall 42 is also generally planar in form and is integrally joined at one end to the back wall 46. The top wall 42 is formed with a front end 50 adjacent the open front end 48 of the housing 40 as well as depending side flanges 52 and 54 which depend from the main, central portion 56 of the top wall 42.

The bottom wall 44 also has a generally planar configuration. Although the bottom wall 44 may be formed of a single elongated member, it is preferred that the bottom wall 44 be formed of first and second bottom wall members 58 and 60, respectively, which are joined at one end to the back wall 46 and extend outward therefrom. The spaced first and second bottom wall members 58 and 60 define an opening 62 between the spaced, opposed inner side edges 64 and 66 thereof as shown in FIG. 1.

The front end of each of the first and second bottom wall members 58 and 60 is formed with an enlarged lip portion 68 which has a smoothly curved outer surface adjacent the open end 48 of the housing 40 as shown more clearly in FIG. 2.

As illustrated in FIGS. 1 and 2, the article holder 10 also includes resilient article support means, denoted in general by reference number 70, which resiliently supports the article, such as the eyeglasses 12, within the article holder 10 and yet allows easy removal and insertion of the article to and from the holder 40. The resilient article support means 70 may be formed of a single element shaped to the configuration illustrated in FIGS. 1 and 2, or it may be formed of separate, individual pieces positioned and connected so to have the same configuration as that depicted in FIGS. 1 and 2.

In a preferred embodiment, the resilient article support means 70 includes a first resilient member 72 which is mounted on the inner surface of the top wall 42 of the housing 40. The first resilient member 72 has a smoothly curved front end which forms a contiguous extension of the smoothly curved front end 50 of the top wall 42.

The resilient article support means 70 also includes second and third resilient members 74 and 76, respectively. The second and third resilient members 74 and 76 are mounted on the first and second bottom wall members 58 and 60, respectively. Each of the second and third resilient members 74 and 76 also has a smoothly curved front end forming a continuation of the smoothly curved surface on the outer enlarged end 62 of the first and second bottom wall members 58 and 60 as shown in FIG. 2.

The first, second and third resilient article support members 72, 74 and 76 extend outward from the back wall 46 of the housing 40 between the spaced top and bottom walls 42 and 44. The opposing surfaces 80 and 82 of the first, second and third resilient article support members 72, 74 and 76 are disposed in substantial registry or contact along a major portion of their length or may be spaced a small distance apart. The first, second and third resilient article support members 72, 74 and 76 due to their resilient nature form a resiliently openable cavity between the opposed surfaces 80 and 82 when an article, such as the crossed temple pieces 20 and 22 of the eyeglasses 12, are inserted therein as shown in FIG. 1. The cavity which surrounds the central portion of the crossed temple pieces 20 and 22 of the eyeglasses 12 prevents fore and aft movement of the eyeglasses 12 within the housing 40. Also, the position of the ear pieces 24 and 26 adjacent the sides of the resilient article support means 70 prevents sideways movement of the eyeglasses 12 with respect to the housing 40 thereby securely maintaining the eyeglasses 12 in a fixed position within the housing 40.

The resilient article support means 70 may be formed of any suitable material which exhibits resilient properties having a memory so as to return to its original shape when an article previously housed therein is removed from the opposed surfaces 80 and 82 of the resilient article support means 70. In a preferred embodiment, a major portion 84 of each of the first, second and third resilient article support members 72, 74 and 76 is formed of an open cell foam which provides the desired resiliency and yet has a memory for returning to its original shape when an article is removed therefrom. An outer cover layer 86 is attached to the outermost surface of the open cell portion 84 of the resilient article support members 72, 74 and 76 to provide a smooth, slidable surface for the removal and insertion of articles to and from the article holder 10. The outer covering 86 may be separate from the open cell portion 84 or may be integrally formed therewith, such as in a cell-skinning foam.

In use, the opposed surfaces 80 and 82 of the resilient article support means 70 will be disposed in substantial registry prior to the insertion of an article therein. Prior to insertion, the temple pieces 20 and 22 of the eyeglasses 12 are crossed and the bridge 24 grasped by the fingers of the wearer of the eyeglasses 12. The central portion of the crossed temple pieces 20 and 22 is then urged inward between the opposed surfaces 80 and 82 of the resilient article support means 70 until the eyeglasses 12 are securely retained within the article holder 10. As described above, the snug fit around the crossed temple pieces 20 and 22 provided by the resilient article support means 70 and the location of the ear pieces 24 and 26 adjacent the side edges of the resilient article support means 70 prevents any movement of the eyeglasses 12 within the holder 12. Yet, the eyeglasses 12 may be easily removed from the holder 10 by grasping the bridge 24 of the eyeglasses 12 and urging the eyeglasses 12 outward from the holder 10. The aperture 62 formed between the opposed sides 64 and 66 of the bottom wall members 58 and 60 provides clearance for the fingers of the user surrounding the bridge 24 of the eyeglasses 12 during either insertion or removal of the eyeglasses 12 to or from the holder 10.

The article holder 10 in a preferred embodiment is provided with a mounting means comprising a planar fastener 90 and a fastener engaging means 92 as shown in detail in FIG. 3. The fastening means 90 has a generally planar shape and is formed of a resilient spring-wire material. The fastener 90 has first and second spaced legs 94 and 96, respectively, which are connected by a central clip portion 98. The central clip portion 98 has a generally U-shaped, open end configuration formed of a central bite member 100, upstanding side legs 102 and 104, and upper end flanges 106 and 108 which are connected to one end of the first and second legs 94 and 96, respectively. The configuration of the central clip portion 98 of the fastener 90 is complimentary to that of the fastener engaging means 92 for slidable connection therewith as described in greater detail hereafter.

The fastener engaging means 92 includes a recess 110 formed in the upper surface of the top wall 42 of the holder 10. A centrally located inner portion 112 is integrally formed with the top wall 42 and extends upward from the central portion 56 of the top wall 42. The dimensions of the inner portion 112 are selected complimentary to the dimensions of the central clip portion 98 of the fastener 90 so as to provide an exterior peripheral surface for sliding engagement of the side walls 114 and 116 of the inner portion 112 with the legs 102 and 104 and the central bite portion 110 of the central clip portion 98 of the fastener 90 to attach the housing 40 to the fastener 90. An outer cover portion 120 overlays the centrally located inner portion 112 within the recess 110 in the top wall 42. The dimensions of the outer cover portion 120 are greater than the overall dimensions of the inner portion 112 such that the outer side and end edges of the outer cover 120 overhang the side walls 114 and 116 of the inner portion 112 as well as the outer end of the inner portion 112. The side walls 122 and 124 of the outer cover 120 are spaced from the side walls 126 and 128 of the top wall 42 to form a part of the recess 110 in the top wall 42 and to provide a locking arrangement which prevents disengagement of the central clip portion 98 from the exterior peripheral recess formed about the side walls 114 and 116 and the end wall 130 of the inner portion 112.

Further details and variations on the configuration and use of the fastener 90 and the fastener engaging means 92 may be had by referring to U.S. Pat. No. 4,723,748, entitled ARTICLE HOLDER, in the name of Allan McCarty, the relevant portions of which are incorporated in this application by reference.

In use, the pointed ends of the legs 94 and 96 of the fastener 90 are inserted through the covering of the support surface 14 such that the central clip portion 98 overlays the exposed surface of the support surface 14 as shown in FIG. 3. The exterior peripheral recess formed by the inner portion 112, the outer cover portion 120 and the recess 110 in the top wall 42 of the housing 40 may then be slidingly engaged with the central clip portion 98 of the fastener 90 to mount the housing 40 to the fastener 90 thereby positioning the housing 40 at any desired location on the support surface 14.

It should also be noted that the description of the fastener 90 and fastener engaging means 92 is by way of example only as providing a convenient removable attachment and mounting means for the housing 40.

Other configurations are also within the scope of this invention and would include, for example, the use of an adhesive or doublebacked tape mounted on a solid top wall 42 of the housing 40.

In summary, there has been disclosed a unique article holder particularly suited for securely mounting a pair of eyeglasses at a readily accessible location on a support surface, such as a support surface within the interior of a vehicle. The article holder of the present invention securely maintains the articles inserted therein without movement during operation of the vehicle and, at the same time, enables easy insertion and removal of such articles to and from the holder.

What is claimed is:

1. An article holder comprising:
   a housing; and
   resilient article support means, mounted within the housing and including first and second opposed surfaces disposed in substantial registry defining a deformably openable cavity therebetween for slidably and releasably receiving an article in contact therebetween;
   wherein the housing comprises: a body having a first wall, a second wall spaced from the first wall, a third wall interconneting one end of the first and second walls and an open end opposed from the third wall and disposed between the other end of the first and second walls.

2. The article holder of claim 1 wherein one of the first and second surfaces of the resilient article support means includes first and second spaced resilient support members forming an aperture between facing side edges thereof.

3. The article holder of claim 1 wherein:
   the resilient article support means is formed of an open cell foam and an outer cover layer attached thereto providing a smoothly slidable surface thereover.

4. The article holder of claim 3 wherein the outer cover layer is integrally formed with the open cell foam portion of the resilient article support means.

5. The article holder of claim 1 wherein:
   the outer end of the second wall includes an enlarged smoothly curved lip portion covering the front edge of the resilient article support means.

6. The article holder of claim 1 further including:
   means for mounting the housing to a support surface.

7. The article holder of claim 1 further including:
   means for releasably mounting the housing to a support surface.

8. An article holder comprising:
   a housing;
   resilient article support means, mounted within the housing and including first and second opposed surfaces disposed in substantial registry defining a resiliently openable cavity therebetween, for slidably and releasably receiving an article therebetween; and
   means for mounting the housing to a support surface, the mounting means comprising:
   planar fastening means having first and second spaced legs slidably penetrable with a support surface and a central clip portion connected to and extending between the first and second legs; and
   fastener engaging means including:
   an open ended recess formed on the top wall of the housing;
   an inner portion having side walls spaced from the side walls of the recess in the top wall defining slots therebetween; and
   an outer cover portion mounted contiguous with the inner portion and having side and end edges overlaying the side and end edges of the inner portion forming in conjunction with the side and end edges of the inner portion and the side walls of the recess in the top wall of the housing an exterior peripheral recess about the inner portion for slidingly receiving the central clip portion of the fastener means.

9. The article holder of claim 8 wherein the central clip portion of the fastener comprises:
   a central bite portion formed of a central member, opposed first and second legs extending therefrom, and outer flanges connected between the first and second legs of the central bite portion and the first and second legs of the fastener.

10. An article holder comprising:
    a housing having a top wall, a bottom wall formed of spaced first and second bottom wall members, each spaced from the top wall, a back wall interconnecting the top wall and the first and second bottom wall members and an open end opposed from the back wall;
    resilient article support means, mounted in the housing including a first resilient article support member mounted on the top wall and second and third resilient article support members mounted on the first and second bottom wall members, respectively, the first, second and third resilient article support members having opposed surfaces defining a resiliently openable cavity therebetween for slidably and releasably receiving an article therebetween;
    mounting means including a planar fastener means and fastener engaging means mounted on the housing;
    the fastener means including:
    first and second legs slidably penetrable with a support surface and a central clip portion connected between the first and second legs having a shape complimentary to the shape of the fastener engaging means for slidably receiving the fastener engaging means mounted on the housing therein; -
    the fastener engaging means including:
    a recess formed in the top wall of the housing; and
    an inner portion integral with the top wall and disposed centrally in the recess; and
    an outer cover overlaying the side and end edges of the inner portion and forming an exterior peripheral recess about the inner portion between the inner portion, the outer cover portion and the spaced side walls of the recess of the top wall of the housing for slidably receiving the central clip portion of the fastener means.

11. The article holder of claim 10 wherein the article stored within the holder is a pair of eyeglasses, with the eyeglasses being stored within the holder with the crossed temple pieces of the eyeglasses being releasably held in the resiliently openable cavity in the resilient article support means and the ear pieces attached to the temple pieces being disposed adjacent to the outer side edges of the resilient article support means.

12. The article holder of claim 1 further including means for mounting the housing to a horizontal support surface, with the cavity in the resilient article support means extending horizontally for supporting an article in a horizontal orientation therein.

* * * * *